Inventor.
Alfred Scheunert.
By. [signature] Atty

Inventor:
Alfred Scheunert
By [signature] Atty.

Inventor:
Alfred Scheunert.
By. [signature] Atty.

United States Patent Office 3,005,875

Patented Oct. 24, 1961

3,005,875

MOTOR-OPERATED ROTARY CONNECTOR FOR EXTENDING CALLS TO DIFFERENT CLASSES OF SUBSCRIBER STATIONS

Alfred Scheunert, Munich-Solln, Germany, assignor to Siemens and Halske Aktiengesellschaft Berlin and Munich, a corporation of Germany Filed May 27, 1959, Ser. No. 816,229

Claims priority, application Germany June 3, 1958

6 Claims. (Cl. 179—18)

Figure 1:
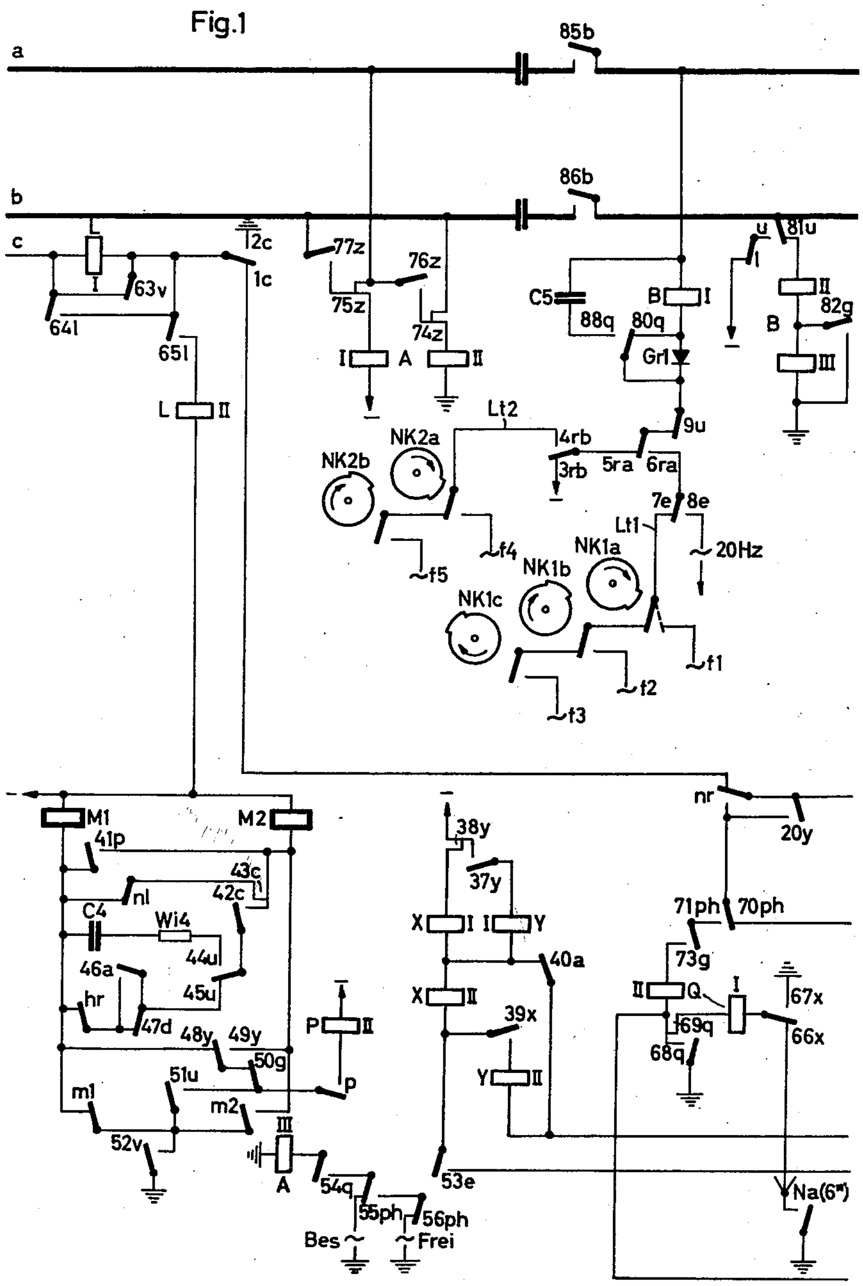

This invention is concerned with rotary connector switches, particularly a motor-operated connector for use in communication exchanges and especially in telephone exchanges, having access to individual lines and private branch exchange lines as well as to party lines the subscribers of which are called by code ringing, especially by different ringing frequencies transmitted in different timing rhythm.

A ringing signal (first ring) is transmitted to idle individual subscriber lines and to private branch exchange lines as in the case of vertical-rotary connectors as soon as the rotary motor connector has established connection with the corresponding line. In the case of party lines, the code rings must be transmitted completely and without distortion so as to avoid wrong calls.

The kind of ringing required for the different classes of subscriber lines may be clearly distinguished by the use of auxiliary devices for the party lines and by small auxiliary ring discriminating switches associated with the respective connectors. The expenditure for such devices is, however, considerable and therefore expensive. The object of the invention is to avoid such expenditure.

The invention provides for this purpose rotary switches, especially motor-operated rotary connector switches equipped with four wipers, utilizing an auxiliary wiper and bank contacts associated therewith over which switching operations are controlled including, for example, control of the hunting over bank contacts of private branch exchange lines and/or control of the connection of code rings for the party lines, for carrying out a discriminating marking or identification of the party lines and of the remaining lines (individual lines and private branch exchange lines) by means of a relay which is responsive to selection of an individual line or of a private branch exchange line operative to effect instantaneous transmission of the corresponding ring to the subscribers of the respective service classes while being responsive to the selection of a party line operative to effect transmission of the corresponding complete code ringing to the desired party line.

In accordance with another feature of the invention, the group-wise discriminating marking or identification of the different subscribers is effected by the provision, ahead of each group (decade) of lines, which is reached responsive to the receipt of the penultimate subscriber digit (tens digit), of a special position (main stop or pretesting contacts) in the corresponding contact bank, to which are connected different potentials, depending upon the kind or class of lines in the respective groups, whether individual subscribers or private branch exchange subscribers or party lines, such potentials effecting a different control of the ringing circuits in accordance with the corresponding requirements. The expression "connecting different potentials" or similar language includes connection or non-connection of one and the same potential, for example, ground potential, to the pre-testing contacts.

The auxiliary wiper of the connector and the bank contacts associated therewith can in this manner be utilized for the control of the switch in executing the hunting operations with respect to private branch exchange lines as well as for the proper and correctly timed connection of coded ringing, without having to connect the code ring frequences directly to the contacts of the auxiliary contact bank.

Special auxiliary devices for the party lines and auxiliary control relays for the connector are made unnecessary. The delay times caused by the connection of ringing for the party lines, which are for the securing of properly timed ringing starts unavoidable and may amount up to 6 seconds, are nevertheless prevented from affecting the connection of the ringing for the individual lines and for the private branch exchange lines. Ringing of these latter lines is now as before effected instantly by the transmission of the first ring as soon as the connector has established connection with an idle one of such lines and the periodic ringing is thereafter effected in customary manner.

The various objects and features of the invention will now be described with reference to the accompanying drawings, wherein FIGS. 1 and 1*a* when placed together with FIG. 1*a* to the right of FIG. 1 show an example of the connector circuit according to the invention; and FIG. 2 indicates in schematic manner the relation of codes combined with direction criteria of potentials and frequencies and the time sequence thereof.

The connector is a motor-operated rotary switch provided with four wipers *a*, *b*, *c*, *d* and an associated set of relays. The line wipers *a*, *b* are during the setting or selection operations lifted off, that is, disengaged from the contacts in the associated contact banks in which a call is to be extended; they are brought into operative engagement with corresponding bank contacts of the desired line after such line has been found idle, by the actuation of a line wiper control magnet A*d*. The test wiper *c* and the auxiliary wiper *d* are, however, in engagement with associated bank contacts during the setting operations of the switch. The switch wipers are actuated in known manner by an electric motor comprising two field coils M1 and M2 (lower left hand part of FIG. 1). The field coils M1, M2 are mutually displaced by 90°. At the intersection of the axes of the field coils is rotatably disposed an unwound Z-shaped armature. This armature is attracted by either one of the field coils upon energization thereof and is in this manner rotated. The field coils are alternately operatively switched in by means of contacts *m*1 and *m*2 which are governed by cams controlled by the motor shaft. The rotating armature drives a gear wheel transmission which in turn drives a shaft carrying the switch wipers which are in this manner continuously rotated. The switch wipers execute one step with each 90° rotation of the armature. Simultaneous energization of both field coils results in a braking force stopping further rotation of the wipers. The switch is provided with a plurality of off-normal contacts *n*1, *nr*, which are in actuated position so long as the switch is off-normal. The switch is also provided with a so-called main stop contact *hr* which is by means of a cam operatively actuated always in the wiper position (main stop position) lying ahead of the groups of outgoing back contacts (decades) and which is restored again in a successive wiper position. There is finally provided a special switch contact *dn* (top left of FIG. 1*a*) which is by a cam closed only in the main stop position and otherwise open. In a practical embodiment, the switch has for ten decades, that is, for ten groups each with ten outlets, a contact bank with 2 times 56 outlets which are successively swept over by two wiper sets mutually displaced by 180°. Only one wiper set has been shown which suffices for the understanding of the invention.

1. *Extension of a call to an individual line*

It shall be assumed that a call is to be extended to the subscriber line having the terminal digits "32." Upon seizure of the connector by a preceding group selector relay A of the connector will energize over the line loop in the circuit (1) +, AII, 74*z*, conductor *b*, line loop, conductor *a*, 75*z*, AI, —

Relay A upon actuating opens its contact 35*a* (FIG. 1*a*, left central part), thereby opening a short circuit about the seizure relay C which energizes in the circuit (2) +, 34*a*, C, resistor W*i*13, —

Relay C closes its contact 31*c*. Relay V is at that instant short-circuited by way of contacts 31*c* and 34*a*. Relay C closes its contact 2*c* (FIG. 1, left top part), thereby placing ground potential on the incoming private conductor *c*, thus busying the connector against further seizure. The line loop is interrupted by the impulses corresponding to the tens digit dialed by the calling party. Relay A in the connector is accordingly impulsewise released. Upon first release of relay A, the short circuit of relay V is interrupted at contact 34*a* and relay V energizes in the circuit (3) +, V–II, 28*g*, 29*ph*, 31*c*, 35*a*, resistor W*i*13, —

Relay C which is pulsewise short circuited upon deenergization of relay A, and relay V which is pulsewise short circuited upon energization of relay A, are held in actuated position during the receipt of the tens digit. Relay V prepares the motor circuit by way of its closed contact 52*v* (bottom left hand part of FIG. 1). However, both field coils M1 and M2 are for the time being energized preventing start of the operation of the switch.

Relay V upon energization opens its contact 63*v* (left hand top part of FIG. 1), thereby opening the short circuit about the winding I of relay L disposed in the incoming private conductor *c*. Relay L energizes in case of a local call and holds itself actuated independently of relay V by way of a second winding LII (top left hand part of FIG. 1), in a circuit (4) +, 2*c*, 65*l*, LII, —

Relay X is operatively connected upon deenergization of relay A, in the circuit (5) + (bottom left of FIG. 1*a*), 10*c*, 12*g*, 40*a* (right lower part of FIG. 1), X—I, 38*y*, —

Figure 1A:
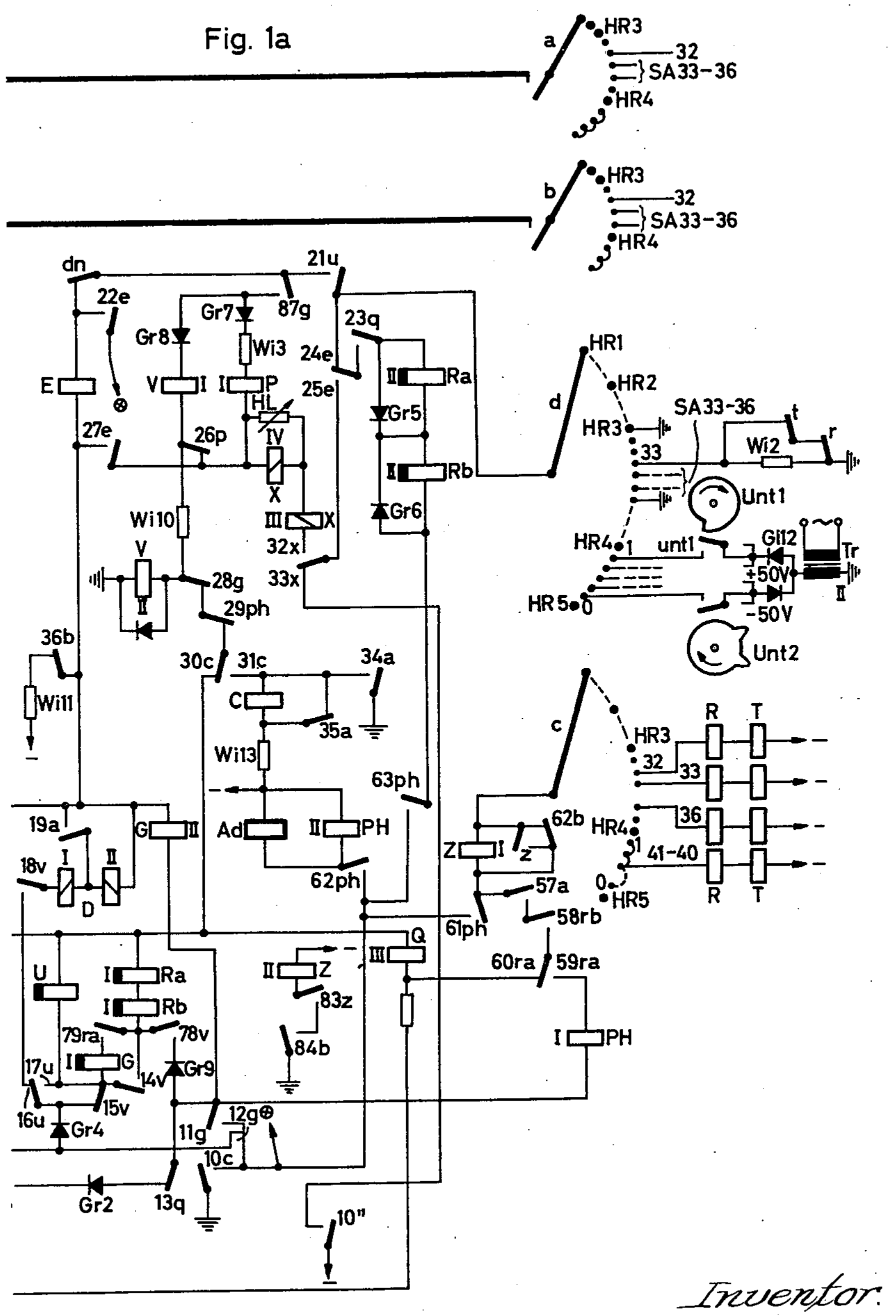

Relay V upon energizing closes for relay D circuit that may be traced in the lower left hand part of FIG. 1*a*, namely, circuit (6) +, 10*c*, 12*g*, rectifier G*r*4, 16*u*, 18*v*, DI, DII, 36*b*, resistor W*i*11, —

However, relay D is not operatively actuated in this circuit since its two windings are in opposition. Relay A is actuated again after the first impulse. Relay Y, winding II (right of center at bottom of FIG. 1), which was until now short circuited over contacts 40*a*, 39*x*, is now energized in series with relay X in the circuit (7) +, 10*c*, 12*g*, YII, 39*x*, X–II, X–I, 38*y*, —

Since the winding II of relay D is now short circuited over contact 19*a*, relay D will be energized in the circuit which may be traced in the lower left hand part of FIG. 1*a*, namely, circuit (8) +, 10*c*, 12*g*, rectifier G*r*4, 16*u*, 18*v*, DI, 19*a*, 36*b*, resistor W*i*II, —

It may be mentioned at this point that the motor of the switch is at this instant still inactive because its two field coils M1 and M2 (left hand bottom part of FIG. 1) are bridged by a circuit (9) M1, *hr*, 47*d*, 45*u*, 42*c*, M2

The switch motor also remained at rest during the first impulse pause when the relay A energized, despite the energization of relay D and consequently open contact 47*d*, because of closed contact 46*a* which maintained the bridge circuit for the two field coils. Such bridge circuit is interrupted by the opening of contacts 46*a* and 47*d* upon de-energization of relay A responsive to the second impulse and subsequent delayed restoration of relay D, thereby placing the field coil M1 in an operating circuit while disconnecting the field coil M2. The motor consequently operates, causing opening of the main stop contact *hr*. The subsequent deenergization of relay D remains accordingly without effect so far as the operation of the motor is concerned. The motor effects rotation of the wipers over the bank contacts of the first decade under control of the cam controlled contacts *m*1, *m*2 which are connected in mutually interacting circuit. Relay X deenergizes upon restoration of relay A since its winding II is short circuited over contacts 40*a* and 39*x* while its winding I is disconnected due to the opening of contact 38*y*. Relay Y is however maintained energized in the circuit

(10) +, 10*c* (bottom left in FIG. 1*a*), 12*g*, over to FIG. 1, contact 40*a*, YI, 37*y*, —

Relay A energizes again in the pause following the second impulse, thereby opening its contact 40*a* and thus interrupting the circuit for relay Y just traced at "10," causing relay Y to restore. Relay D is now actuated again in the circuit "8." As soon as the switch wipers reach the main stop position HR2 (FIG. 1*a*), which precedes the bank contacts of the second decade, contact *hr* (bottom left of FIG. 1) will be closed again. Since contact 46*a* is at this instant closed, the bridge for the two field coils M1 and M2 is reestablished, resulting in energization of both field coils and consequently stopping further rotation of the switch wipers.

Relay A deenergizes again responsive to the third and last impulse, thereby opening the bridge between the field coils M1 and M2, thus causing the switch to resume operation and to rotate the wipers again. Relay D restores and relay X reenergizes in the circuit "5." The interplay is repeated. The switch wipers stop ahead of the main stop position HR3 (FIG. 1*a*) of the third decade since relay A is energized again, the stopping continuing now for a somewhat longer interval since it is effected at the termination of the tens impulse series. Relay X is still energized and relays D and Y are caused to energize. Since the main stop contact *hr* is now closed, the bridge between the field coils M1 and M2 is active to effect stopping of the motor.

The prolonged energization of relay A effects restoration of relay V (left central part of FIG. 1*a*) by the opening of the short circuit extending by way of contacts 34*a* and 31*c*. Relay V upon restoring opens contact *v*1, thereby causing restoration of relay *D* (left hand lower part of FIG. 1*a*). Relay V also opens its contact 52*v* (left hand bottom of FIG. 1), thereby disconnecting both field coils M1 and M2. Relays X and Y are still energized. Upon restoration of relay V, relay U (left hand bottom of FIG. 1*a*) is energized in the circuit

(11) +, 10*c*, 12*g*, G*r*4, *v*15, U, over to FIG. 1, 70*ph*, 20*y*/*nr*, back to FIG. 1*a*, 36*b*, resistor W*i*11, —

Relay U remains energized in a holding circuit over its own contact 17$u$ independently of relay V.

In accordance with the invention, ground is connected to the main stop position or contact HR3 of the contact bank accessible to the wiper $d$, it being assumed that the third decade includes no party lines but only the bank contacts of individual subscriber lines as, for example, the called subscriber line 32, or private branch exchange lines as, for example, the lines 33 to 36. Accordingly, upon energization of relay U, relay E will be energized by way of wiper $d$ and the main stop position or contact HR3, in the circuit

(12) +, HR3, wiper $d$, 21$u$, $dn$, E, 36$b$, Wi11, —

Relay E will be held energized over its contact 22$e$ in the circuit

(13) +, 10$c$, 22$e$, E, 36$b$, resistor Wi11, —

Relay E prepares at its contacts 8$e$ (top right hand part of FIG. 1) and 25$e$ (top central part of FIG. 1$a$) the ringing circuits for the first ring and for the 10 sec. ring of the individual subscriber.

The line relay A of the connector is impulsewise released two times responsive to the receipt of the impulses corresponding to the units digit "2."

It may be mentioned at this point that the bridge between the two field coils M1 and M2 was responsive to energization of relay U interrupted at contact 45$u$ and that a damping member was by way of contact 44$u$ and 42$c$ bridged across the field coils, such damping member comprising a capacitor C4 and a resistor Wi4.

Upon restoration of relay A responsive to the receipt of the first impulse of the units series, relay V (left hand central part of FIG. 1$a$) will energize by way of its winding II. Relays X and Y are still actuated. Upon energization of relay V, relays R$a$ and R$b$ energize over their windings R$a$I and R$b$II (bottom left hand part of FIG. 1$a$) in the circuit

(14)
+, 10$c$, 12$g$, Gr4, 17$u$, 14$v$, R$b$I, R$a$I, over to FIG. 1, 70$ph$, 20$y/nr$, back to FIG. 1$a$, 36$b$, resistor Wi11, —

Relay V again prepares at contact 52$v$ the circuit for the field coils M1 and M2 of the motor; however, both field coils are for the time being energized, namely, field coil M1 by way of contacts 52$v$, $m$1 and field coil M2 by way of contacts 52$v$, 51$u$, 50$g$ and 49$y$.

Relay Y which had been held energized in the circuit "10," over its winding I and contact 37$y$, deenergizes upon opening of contact 40$a$ responsive to energization of relay A at the conclusion of the impulse. Contact 49$y$ is accordingly opened and field coil M1 alone will remain energized, causing the motor to actuate and to rotate the wipers by one step, whereupon braking force becomes effective to stop the motor due to opening of cam controlled contact $m$1 and closure of cam controlled contact $m$2, placing both field coils on current again, namely, the field coil M2 in the circuit

(15)
+, 52$v$, $m$2, M2, — and the field coil M1 in the circuit

(16)
+, 52$v$, 51$u$, 50$g$, 48$y$, M1, —

Upon deenergization of relay A responsive to the second and therewith last impulse of the units impulse series, relay X will be energized again in the circuit "5." Upon reenergization of relay A at the conclusion of the impulse, relay Y will be connected in series with relay X in the circuit "7." Both relays will be held actuated in the circuit

(17)
+ at left bottom of FIG. 1$a$, 10$c$, 12$g$, over to FIG. 1, YII, 39$x$, X–II, YI, 37$y$, —

The field coil M1 is disconnected again at contact 48$y$, field coil M2 remaining energized, and the motor accordingly rotates the switch wipers through the second step to place them in alignment with the bank contacts of the called subscriber line 32.

Relay A remains actuated upon conclusion of the selection operation and relay V accordingly restores due to the prolonged short circuit around its winding V–II extending by way of contacts 34$a$ and 30$c$. Relay G the winding I of which (left hand bottom of FIG. 1$a$) was short circuited over contacts 14$v$ and 79$ra$ energizes now in series with the windings I of relays R$a$ and R$b$ in the circuit

(18)
+, 10$c$, 12$g$, Gr4, 15$v$, GI, 79$ra$, R$b$I, R$a$I, over to FIG. 1, 70$ph$, 20$y/nr$, back to FIG. 1$a$, 36$b$, resistor Wi11, —

Relay G remains actuated in a holding circuit over its second winding GII and its own contact 11$g$ independently of the relays, V, R$a$, PH, Y, in the circuit

(19) +, 10$c$, 11$g$, GII, 36$b$, resistor Wi11, —

Relay G opens upon actuation its contact 12$g$, causing release of relays U, R$a$, R$b$ (see circuit "14"), all of which restore with some delay. Relay G also interrupts the holding circuit of relays X and Y by opening its contact 12$g$ (see circuit "10") but relay X is immediately reenergized in the circuit

(20) +, 10$c$, 11$g$, 13$q$, Gr2, over to FIG. 1, 53$e$, X–II, X–I, 38$y$, —

During the restoration interval of relays R$a$ and R$b$, the switch tests by way of wiper $c$ whether or not the called line is idle. If idle, the relay PH will be energized over its winding PHI (right bottom of FIG. 1$a$) in the circuit

(21) +, 10$c$, PHI, 59$ra$, 58$rb$, 59$a$, 62$b$, wiper $c$, line and cutoff relays R, T in the line circuit of the called line, —

Relay PH will be held energized over its winding PHII in the circuit

(22) +, 10$c$, 62$ph$, PHII, —

In case the called line is busy, relay PH will not energize.

In case the desired line is busy, instead of negative potential, there will be ground potential on its private conductor $c$, such condition being omitted in FIG. 1$a$ for simplicity sake. In such condition, after deenergization of relay R$a$ and during the release interval of relay R$b$ which exceeds that of relay R$a$, relay Q will energize over its winding QIII (center bottom of FIG. 1$a$) in the circuit

(23) +, wiper $c$, 62$b$, 57$a$, 58$rb$, 60$ra$, QIII, over to FIG. 1, 70$ph$, 20$y/nr$, back to FIG. 1$a$, 36$b$, resistor Wi11, —

Relay Q will be held actuated independently of relay R$b$ in the circuit

(24) +, 68$q$ (bottom right hand of FIG. 1) over to FIG. 1$a$, unmarked resistor, QIII, back to FIG. 1, 70$ph$, 20$y/nr$, over to FIG. 1$a$ again, 36$b$, resistor Wi11, —

Busy tone B$es$ will be connected to the winding III of relay A (bottom left of FIG. 1) in a circuit

(25) +, B$es$, 55$ph$, 54$q$, AIII, —

The busy tone is inductively transmitted over the windings of line relay A lying on the line conductors back to the calling party, inducing such calling party to restore the receiver and thereby effecting release of the connection. Line relay A and therefore the seizure relay C and subsequently relays G, L and E are accordingly released. Relay V is energized again after release of relay C to aid in causing the switch to restore to its normal position.

However, if the called line is idle, the line wiper control magnet A$d$ (lower center of FIG. 1$a$) will be actuated in parallel with the holding winding II of relay PH in the circuit

(26) +, 10$c$, 62$ph$, A$d$, —

The magnet A*d* presses the line wipers *a* and *b* into engagement with the bank contacts of the called line, thereby connecting these wipers through.

The first ring is connected to the outgoing line conductors immediately after restoration of relay C and during the restoration interval of relay R*a* in the circuit

(27) + (right hand center of FIG. 1), 20 cycles, 8*e*, 6*ra*, 9*u*, 80*q*, BI, upper line conductor, wiper *a*, subscriber's line loop (ringer), wiper *b*, 81*u*, BII, 82*g*, +

Responsive to actuation of relay PH, relay Q is actuated over its windings QI and QII (bottom right of FIG. 1) in the circuit

(28) +, 67*x*, QI, 69*q*, QII, 73*g*, 71*ph*, *nr*, over to FIG. 1*a*, 36*b*, resistor W*i*11, —

Relay Q is held independently of relay X in the circuit

(29) +, 68*q*, QII, 73*g*, 71*ph*, *nr*, 36*b*, resistor W*i*11, —

Relay R*a* has meanwhile restored and by opening its contact 6*ra* has terminated the first ring. In case the called subscriber answers in response to the first ring by removing his receiver, relay B will energize over the called subscriber's line loop. In case the called subscriber does not answer immediately, the circuit for the windings I and II of relay X (circuit "20") will after energization of relay Q be interrupted due to opening of contact 13*q* but relay X will continue to be actuated in the circuit

(30) +, 10*c*, 63*ph*, G*r*6, R*a*II, 23*q*, 25*e*, 32*x*, X–III, X–IV connected in parallel with HL (thermistor), 27*e*, 36*b*, resistor W*i*11, —

Relay R*a* again operates in this circuit and places ringing current on the called line, Relay X is held energized in this circuit by way of its winding IV since its ampere winding number is higher than the ampere winding number of the oppositely connected winding X–III. The thermistor HL connected in parallel to the winding X–IV which has initially a high resistance, heats up and its resistance is gradually reduced, thereby effecting reduction of the current and therewith of the ampere winding number of the parallel winding. The current increases on the other side, thereby increasing the ampere winding number in the winding X–III. The consequence is that the ampere winding numbers of the two windings become gradually similar, causing deenergization of relay X. Relay R*a* is now connected to the 10 sec. switch or ringing interrupter 10″ (bottom of FIG. 1*a*) in the circuit

(31) +, 10*c*, 63*ph*, G*r*6, R*a*II, 23*q*, 25*e*, 33*x*, 10 sec., —

A ringing signal is now transmitted to the called party every 10 seconds. When the called party answers, relay B will be actuated over the called party's line loop and, by opening its contact 62*b*, will effect actuation of relay Z over its winding ZI disposed in the test circuit, relay Z energizing in the circuit

(32) +, 10*c*, 61*ph*, ZI, wiper *c*, R, T, —

Relay Z is held actuated over its second winding ZII in a circuit

(33) +, 84*b*, 83*z*, ZII, —

Relay B, at its contacts 85*b* and 86*b* connects the line conductors through. Relay Z, by opening its contacts 74*z*, 75*z* and closing its contacts 76*z* and 77*z* reverses the incoming line conductors, thereby transmitting in known manner a criterion to initiate metering of the call. Relays E, Q, G deenergize due to opening of contacts 63*b*.

Replacement of the receiver by the called party, at the completion of the call, causes release of the battery feed relay B and of the relay Z. The latter reverses the line conductors again. If the calling subscriber now restores his receiver, the release of the connection will be effected. Relay A in the connector will be released due to opening of the line loop and the seizure relay C, test relay PH and line wiper control magnet A*d* will subsequently release. Responsive to release of relays G and H, relay V will be energized again in the circuit

(34) +, V–II, 28*g*, 29*ph*, 30*c*, 70*ph*, *nr*, 36*b*, resistor W*i*11, —

The energization of relay V effects operative connection either of the field coil M1 or of the field coil M2. The switch operates, automatically controlling its operation, until reaching the home position in which the off-normal contact *nr* interrupts the circuit of relay V while the off-normal contact *n*1 closes over closed contact 43*c* a bridge for the two field coils M1 and M2. The switch is thus restored to normal position.

2. *Extension of a call to a private branch exchange line*

It shall be assumed that a call is to be extended to the private branch exchange line having the terminal number "33," such private branch exchange having four lines 33 to 36. The lines of this private branch exchange are likewise in the third decade which is marked by ground potential at the main stop position or bank contact HR3 in the contact bank accessible to the wiper *d*.

The connector is set by the last two digits of the private branch exchange number in the same manner as in connection with the extension of a call to an individual station, only with the difference that the wipers of the connector responsive to the units digit reach in the third decade the bank contacts "3" from which extends the first line of the private branch exchange. It may be noted, however, that relay E is in such case also energized after receipt of the tens digit and that such relay remains energized in a holding circuit.

If the connector finds the first line of the private branch exchange idle, which is signified by non-energized condition of the relays T and R of the line circuit, with the contacts *t* and *r* thereof in closed position, test relay P will energize after actuation of relay G as soon as the wipers of the connector reach such line, the test relay P energizing in the circuit.

(35) +, *r*, *t*, wiper *d* (33), 21*u*, 87*g*, G*r*7, resistor W*i*3, PI, 27*e*, 36*b*, resistor W*i*11, —

Relay P upon actuating immediately opens contact 26*p* to disconnect the parallel connected winding I of relay V so as to prevent further free hunting rotation of the wipers. Contact 41*p* places at the same time a bridge circuit interconnecting the two field coils M1 and M2 so as to stop the motor and therewith further rotation of the switch wipers.

In case the first line of the private branch exchange is busy, contacts *t* and *r* which bridge the resistor W*i*2 will be open. The test relay P of the connector receives over this resistor insufficient current and remains at normal. The parallel disposed relay V is however actuated in the circuit

(36) +, resistor W*i*2, wiper *d* (33), 21*u*, 87*g*, G*r*8, V–I, 26*p*, 27*e*, 36*b*, resistor W*i*11, —

It may be mentioned at this point that relay V deenergized briefly at the conclusion of the last impulse series, thereby effecting actuation of relay G; relay V however reenergizes immediately over its winding I to provide holding circuits for relays U, R*a* and R*b*, namely, circuits

(37) +, 10*c*, 11*g*, G*r*9, 78*v*, R*b*I, R*a*I, 70*ph*, *nr*, 36*b*, W*i*11, — and

(38) +, 10*c*, 11*g*, G*r*9, 78*v*, 14*v*, U, 70*ph*, *nr*, 36*b*, W*i*11, —

The switch motor continues to rotate in the circuit over contact 52*v*, after energization of relay V, since the field coils M1 and M2 are not bridged due to the energization of relays C, U and G, seeking by the rotation of the wipers in free hunting operation an idle line within the private branch exchange. If an idle line is found, the resistor such as W*i*2 of such line will be bridged by the associated closed contacts *r* and *t*. Relay P can now be energized in parallel to relay V, thereby stopping the hunting operation of the switch and at the same time disconnecting relay V. The test relay PH can now energize (see circuit "21") on the idle line by way of the wiper *d*. The subsequent operations correspond to those explained in connection with the extension of a call to an individual subscriber line. The first ring is immediately transmitted, followed by ringing at 10 sec. intervals.

In the event that no line of the private branch exchange is found idle, the switch wipers will be rotated into engagement with the bank contacts of the last line thereof, the last bank contact encountered by wiper *d* carrying direct ground potential, allowing test relay P to energize and thus causing the switch to stop rotating the wipers. If this last line is idle, the auxiliary test relay PH can again energize by way of the wiper *c*, causing immediate transmission of the first ring to such last line. However, if such line is also busy, relay PH cannot energize but since ground potential is on the private conductor *c* of the last line, relay Q will energize and cause transmission of the busy tone to the calling party in a manner already described.

3. *Extension of a call to a party line*

It shall be assumed that decade 4 of the connector contains a party line with ten subscribers having the terminal numbers 41 . . . 40. In accordance with the invention, the main stop position HR4, preceding this decade does not have ground potential connected thereto.

Each party line has in the connector as many bank positions as there are subscribers connected thereto. For example, the party line having ten subscriber stations, is multiplied over ten outlets or bank contact positions. This is symbolized in FIG. 1*a* by the multiple wiring of the ten outlets of the contacts of the *a*, *b* and *c* banks. Accordingly, the desired subscriber station of the party line is determined by the bank contact of the connector which is reached by the wipers after the "units" selection.

The corresponding bank contact *d* of the fourth decade of the connector are also associated each with a party line station; however these bank contacts are not mutually multiplied but each has a timer connected therewith which is circuited in the manner of an interrupter adapted to control, for the different code ringing, in different rhythm the ringing frequencies *f*1, *f*2 . . . *f*5 (FIG. 1) which are to be connected to the line conductors. In order to keep the number of rhythms or timing signals as well as the number of ringing frequencies smaller than the number of subscriber stations on a party line, the ringing frequencies are in accordance with a further feature of the invention connected to the line conductors in a predetermined time sequence, by means of suitable contacts controlled by cams N*k*1*a*–N*k*1*c* and N*k*2*a*–N*k*2*b* (FIG. 1) and the timing signals controlling these frequencies are synchronously therewith, that is, in the same time sequence, connected to the bank contacts accessible to the wiper *d*. The corresponding arrangement entails under some circumstances a certain delay in the ringing of a party line, which may under some conditions amount up to 10 seconds.

In order to keep these delays within tolerable limits, the invention proposes in accordandce with another feature thereof, to combine the timing signals allotted to the respective party line subscribers with directional current criteria which are evaluated in the connector by means of directionally sensitive relays. These criteria make it possible to effect the connection of the ringing frequencies in two different groups, whereby a plurality of ringing frequencies may be placed into the same time interval without producing wrong calls. Thus, for example, five ringing frequencies *f*1 . . . *f*5 are used for ten subscriber stations of a party line, such frequencies being controlled by two codes. One code consists of one long impulse and the other of two short impulses. Two groups of ringing frequencies are formed by two directional current criteria, for example, +50 v. and −50 v., one group for the frequencies *f*1, *f*2, *f*3, and the other group for the frequencies *f*4, *f*5. The first frequency group is connected to the line conductors by way of a line L*t*1 and the second group by way of a line L*t*2. The connection of the first frequency group is effected by the current direction sensitive relay R*a* and the second frequency group by the polarized relay R*b*. The frequencies are connected to these lines L*t*1 and L*t*2, and therewith to the line conductors, in a time sequence, for example 2 seconds, by corresponding cams N*k*1*a*, N*k*2*a*, N*k*1*b*, N*k*2*b* and N*k*1*c*. The two respective codes "long" and "two times short" are synchronously therewith successively connected to the bank contacts associated with the wiper *d*, by means of corresponding interrupters U*nt*1 and U*nt*2, the interrupter U*nt*1 connecting +50 v. and the interrupter U*nt*2 connecting −50 v. in the corresponding code, as indicated in FIG. 1*a* in connection with the *d* bank contacts for the party line stations "41" and "40," respectively, thereby controlling in the proper rhythm and the proper time the operation either of the relay R*a* (for example, for the party line "41") or relay R*b* (for the party line "40").

Figure 2:
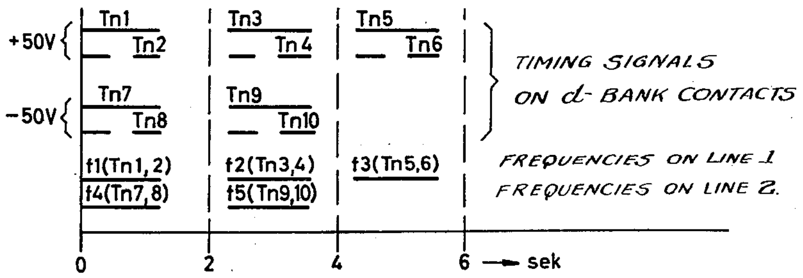

FIG. 2 shows in schematic manner the code at the *d* contact bank of the connector combining the two directional criteria of +50 v. and −50 v. with the frequencies and their sequence in time. To the bank contacts corresponding to the subscriber stations T*n*1, T*n*3, T*n*5 is connected the code "one time long" with +50 v.; to the bank contacts corresponding to stations T*n*2, T*n*4, T*n*6 is connected the code "two times short," likewise with +50 v.; to the bank contacts corresponding to stations T*n*7 and T*n*9 is connected the code "one time long" with −50 v.; and to the bank contacts corresponding to stations T*n*8 and T*n*10 is connected the code "two times short" likewise with −50 v., all of which is effected in a time sequence of 2, 4 and 6 seconds. The effect of connecting the current directional codes to the bank contacts accessible to wiper *d* is that relay R*a* and R*b* is actuated by the directional current from the bank contact engaged by the wiper *d*, the corresponding relay being actuated and closing its contacts (in FIG. 1, contacts 6*ra* and 3*rb*, respectively) so as to connect the required ringing frequency to the line conductors. Party line station T*n* receives by way of line L*t*1 (FIG. 1) one long ring of frequency *f*1, station T*n*2 two short rings with frequency *f*1; station T*n*3 one long ring with frequency *f*2; station T*n*4 two short rings with frequency *f*2 (the latter two shifted by 2 seconds); station 5, one long ring with frequency *f*3; station 6, two short rings with frequency *f*3 (both shifted by 4 seconds). The manner of ringing for the remaining stations may be easily derived from FIG. 2.

In order to always provide for a time-correct start of the transmission of the ringing frequencies and therewith for complete and undistorted ringing of the party line subscribers, which is with centralized interrupter and cams for the connection of the frequencies and signalling rhythm for a connector group not secured, there is provided a special start impulse which is transmitted to a connector every 6 seconds by a likewise centralized timer Na(6") shown at the right hand bottom of FIG. 1 The code ringing signal for the corresponding party line station can be placed on the line conductors only after evaluation of this start signal or impulse in the connector. Depending upon the appearance of the start impulse and the ringing frequencies, a party line station may receive a ring almost instantaneously or, in the case of unfavorable appearance of the start impulse, with a delay up to 10 seconds.

The foregoing introductory explanations are considered essential for the understanding of the switching operations which will now be described more in detail in connection with the extension of a call.

It shall be assumed that the party line station to be called has the terminal number "41." The setting of the connector responsive to the tens digit "4" is effected in the same manner as in the extension of a call to an individual line. The connector receives four current impulses and sets its wipers with the wiper *d* in engagement with the main stop position or bank contact HR4. Since there is no ground potential on this contact, as contrasted with other connections, relay E will not be energized responsive to operative actuation of relay U. The units digit, consisting of a single current impulse, causes the switch by the actuation of relay Y to step the wipers by one step, the wipers *d* and *c* thus reaching bank contact 41. Upon conclusion of the units digit, relays G, R*a* and R*b* will be energized as in the other instances of extending calls. If the party line is idle, relay PH will energize in a circuit by way of the wiper *c* and the corresponding relays R, T in the subscriber's line circuit. However, relay X which energized in the case of the other extensions of calls responsive to operative actuation of relay G, will in this case remain at rest.

If the party line station is busy, ground potential will be on the corresponding *c*-bank contact instead of negative potential, causing during the release time of relay R*b* energization of relay Q over its winding III, relay Q remaining energized in a holding circuit. Relay PH does not energize. The calling subscriber receives busy tone in the manner already described; the connection is released responsive to the replacement of the receiver at the calling station.

However, if the called party line station "41" is idle, relay PH will energize over its winding I as already described. Relay PH will be held actuated over its winding II independently of relays R*a* and R*b*. Responsive to actuation of relay PH, relay Q will be energized by a start impulse by way of the 6-second contact N*a*(6") in the circuit

(39) +, N*a*(6"), 66*x*, QI, 69*q*, QII, 73*g*, 71*ph*, *nr*, over to FIG. 1*a*, 36*b*, resistor W*i*11, —

Relay Q remains energized over its own contact 68*q* in the holding circuit

(40) +, 68*q*, QII, 73*g*, 71*ph*, *nr*, 36*b*, resistor W*i*11, —

As soon as relay Q energizes, relay R*a* can energize by way of the *d*-contact bank of the connector, in the circuit

(41) +, transformer T*r*II, GL12 (+50 v.), *unt*1, wiper *d* on bank contact 41, 24*e*, 23*q*, R*a*II, G*r*6, 63*ph*, 10*c*, —

The frequency *f*1 is placed on the line within the same 2-second interval by means of the contact actuated by the cam N*k*1*a*. Since the relay R*a* is in this instance actuated for a prolonged interval, the frequency *f*1 is placed on the line conductors as a long impulse (ring) in the circuit

(42) +, *f*1, L*t*1, 7*e*, 6*ra*, 9*u*, 88*q*, capacitor C5, wiper *a*, subscriber loop (ringer), wiper *b*, 81*u*, BII, 82*g*, +

The ringer of the party line station "41" is tuned to this frequency. The subscriber recognizes the long ring assigned to him and responds by removing his receiver. The battery feed relay B in the connector energizes after deenergization of relay R*a*, relay B switching the line conductors through as in case of other calls and causing relay Z to operate for purposes of call metering as described before.

The release of the call at the completion thereof is effected by the replacement of the receivers at the calling and called stations, causing release of relays B, A, C, Q, Z, A*d*, L and PH. Relay V is reenergized to effect home run of the connector to its normal position in which it is stopped by the actuation of its off-normal contacts. Opening of the off-normal contact *nr* causes release of relay V. The connector and the relays thereof are now again at normal.

Changes may be made within the scope and spirit of the appended claims.

I claim:

1. A motor-operated rotary connector having access to individual subscriber stations and to private branch exchange stations and to party line stations, comprising an auxiliary wiper and bank contacts cooperatively associated therewith for controlling diverse switching operations in the extension of calls, a control relay, circuit means including said auxiliary wiper and said bank contacts and said control relay for effecting discriminating identification of said party line stations and said other stations, said discriminating identification of stations of different service classes being effected in said auxiliary contact bank according to groups, comprising group contacts disposed in said auxiliary contact bank ahead of the bank contacts of the respective groups, means for connecting different predetermined potentials to said group contacts to effect pretesting by the auxiliary wiper cooperatively associated with said auxiliary bank contacts, and circuit means controlled by said relay for respectively effecting immediate transmission of the first ringing signal to individual subscriber stations and to private branch exchange stations after completion of the corresponding selection operations and for securing transmission of complete code ringing to desired party line stations responsive to completion of the selection operations involving party line stations.

2. A connector circuit arrangement according to claim 1, comprising a control relay, switch-controlled contact means which is operatively actuated only when said auxiliary wiper is in engagement with one of said group contacts, circuit means including said contact means and said auxiliary wiper and effective after receipt of the tens impulse series for evaluating the respective potentials, said control relay being energized responsive to selection of individual subscriber stations and of private branch exchange stations, means controlled by said relay in energized position thereof for controlling the immediate transmission of the first ringing signal to the respective station being called, said control relay remaining deenergized responsive to selection of a party line station, a code-ring control circuit, means for delivering a code-ring start criterion, and means governed by said control relay in deenergized position thereof for preparing said code-ring control circuit by way of said auxiliary wiper, the operative actuation of said code-ring control circuit depending upon delivery of a start signal criterion.

3. A connector circuit arrangement according to claim 2, wherein said code-ring control circuit comprises two differently polarized relays, two different groups of frequency sources, a plurality of different potentials, cooperatively associated with bank contacts of party lines in said auxiliary bank of contacts, and circuit means for operatively affecting said polarized relays by said potentials to effect selective connection of said frequency groups to the line conductors for selectively ringing the respective party lines.

4. A connector circuit arrangement according to claim 3, comprising interrupter means cooperatively associated with the party line bank contacts in said auxiliary contact bank, for additionally controlling the operative actuation of said polarized relays for different time intervals during which the respective ringing frequencies are to be connected to the line conductors.

5. A connector circuit arrangement according to claim 4, wherein said polarized relays are connected to the contacts in said auxiliary contact bank in predetermined time sequence and predetermined duration, the connection of the different ringing frequencies within a frequency group to the line conductors being effected synchronously in identical time sequence and duration.

6. A connector circuit arrangement according to claim 5, wherein said potentials are direct current potentials, comprising a transformer for deriving said direct current potentials from an alternating current source, the secondary side of said transformer being connected by way of differently polarized rectifiers to provide different half-waves for different contacts in said auxiliary contact bank for the actuation of said polarized relays.

References Cited in the file of this patent

UNITED STATES PATENTS

| | | |
|---|---|---|
| 1,203,887 | Lundell | Nov. 7, 1916 |
| 2,411,525 | Deakin | Nov. 26, 1946 |
| 2,806,089 | Gatzert | Sept. 10, 1957 |